United States Patent [19]

Gomm et al.

[11] 3,886,356

[45] May 27, 1975

[54] OPTICAL INSPECTION APPARATUS

[75] Inventors: Thiel J. Gomm; Stephen E. Price, both of Salt Lake City, Utah

[73] Assignee: Inex, Inc., Denver, Colo.

[22] Filed: Oct. 29, 1973

[21] Appl. No.: 410,538

Related U.S. Application Data

[63] Continuation of Ser. No. 395,944, Sept. 10, 1973, abandoned.

[52] U.S. Cl. .......... 250/223 B; 209/111.7; 356/240
[51] Int. Cl. .................................... H01j 39/12
[58] Field of Search ........... 250/223 R, 223 B, 562, 250/563, 571, 572; 209/111.7; 178/6.8; 356/240

[56] References Cited
UNITED STATES PATENTS

| | | | |
|---|---|---|---|
| 2,798,605 | 7/1957 | Richards | 209/111.7 |
| 2,919,624 | 1/1960 | Lindemann | 250/563 |
| 3,360,651 | 12/1967 | Linderman | 250/563 |
| 3,517,205 | 6/1970 | Sainsbury | 250/223 B |
| 3,716,136 | 2/1973 | Birner | 209/111.7 |
| 3,729,635 | 4/1973 | Shottenfeld | 250/219 S |
| 3,731,205 | 5/1973 | Gardner | 250/223 B |
| 3,746,784 | 7/1973 | Oosterhaut | 250/223 B |
| 3,770,969 | 11/1973 | Ansevin | 209/111.7 |
| 3,786,265 | 1/1974 | Abilock | 250/562 |

Primary Examiner—James W. Lawrence
Assistant Examiner—D. C. Nelms
Attorney, Agent, or Firm—K. S. Cornaby

[57] ABSTRACT

An optical scanning device with associated circuitry and components for identifying a defect in a transparent or translucent item by measuring the light passing qualities thereof, to determine whether such a defect is extensive enough for rejection of that item, and including means for removing that item from other such items. The present invention includes, in combination, certain known optical scanning components and circuits, specifically, a perturbation detector and a filter-discriminator circuit which are disclosed in copending appplications for United States Patents. Included with those items are other circuits for refining signal outputs from said filter-discriminator circuit to determine the acceptability of an item under inspection, and has arranged therewith, means for removing an unacceptable item from a column of passing items, completing thereby the inspection process.

12 Claims, 7 Drawing Figures

OPTICAL INSPECTION APPARATUS

RELATED APPLICATION

This application is a continuation of U.S. application Ser. No. 395,944, filed Sept. 10, 1973 for "Optical Inspection Apparatus," now abandoned.

BRIEF DESCRIPTION OF THE INVENTION

1. Field of the Invention

This invention relates to a combination of components and circuitry arranged in an apparatus for performing an automated inspection of each item in a moving column of transparent or translucent items.

2. Prior Art

Numerous devices have long been known and in common use for inspecting a moving column or line of items, particularly glass bottles, to identify blemishes, flaws, cracks, foreign objects, and like defects in one or more of the items, rejecting each such defective item prior to filling that item with a food product or the like. Specifically, devices like those shown in U.S. Pat. Nos. 3,187,185; 3,230,305; 3,355,980; and 3,436,555, have all involved spaced apart optical scanning arrangements for examining all sides of an object, determining from that inspection certain characteristics of that object. While the present invention also employs optical scanning arrangements that are spaced strategically apart, both the arrangement and the function of the circuit components of the present invention are unlike any of the cited art.

Like the present invention certain prior art devices such as those shown in U.S. Pat. Nos. 3,349,906; 3,601,616; 3,629,595; 3,746,784; and 3,651,937, have all involved inspection apparatus which utilizes light transmission properties of a bottle in the inspection thereof, and includes means for identifying and removing such defective bottle out from a column or line of like bottles. While the function of the present invention also involves this same approach to bottle inspection, the specific components and their performance in combination in the present invention is unlike any of the above cited patents.

While certain of the individual component assemblies of the present invention may be identifiable in the above cited art or in certain other U.S. Pat. Nos. 3,261,967; 3,280,692; 3,389,789; 3,547,265; 3,746,784; and 3,576,442, none of these references nor any device or combination of components within our knowledge is like that of the present invention, either in arrangement or in the manner of its operation.

Of the art known to us the U.S. Pat. Nos. 2,798,605 and 3,746,784 appear to be the closest in theory and operation to our present invention, each involving electrically scanning an item with a camera means. Each of these prior art devices however, unlike the present invention, involves scanning horizontally, providing circuitry for cutting off the leading and trailing edges of the item under inspection in each complete horizontal scan. The device of U.S. Pat. No. 2,798,605, involves cutting of a leading edge of the item in a first half scan, then flip flopping over to cut off a trailing edge thereof, which operations constitute a single horizontal scan like that of U.S. Pat. No. 3,746,784. The device of U.S. Pat. No. 3,746,784 scans across the item cutting off, during that scan, both leading and trailing edges of the item. The present invention, rather than sweeping horizontally, sweeps vertically, with whole scans of the leading and trailing portions of the items being eliminated so as to form a desired bottle window.

SUMMARY OF THE INVENTION

It is a principal object of the present invention to provide apparatus for automatically inspecting transparent and translucent items for defects, including means for presetting defect tolerance limits therein, and apparatus for removing an item determined to have a defect that is greater than the preset tolerance limit.

Another object is to provide a preferred arrangement of a number of optical inspection apparatus of the present invention, each capable of simultaneously, from different angles, sweeping vertically, in turn, each item under inspection, insuring thereby that a defective item will not escape detection even should that defect be located at the edge of the item with respect to any one optical inspection apparatus.

Another object is to provide an optical inspection apparatus capable of identifying a number of defects within a transparent or translucent item from the light transmission properties of that item only.

Still another object is to provide apparatus and circuitry constructed so as to lend itself to a convenient incorporation into a housing or cabinet structure, optical scanning portions thereof also contained in said housing, scanning vertically through an appropriate opening, a column of items moved by conventional conveying means, between the scanning portions and a light source.

Still another object is to provide, in combination, certain known apparatus and circuitry with other circuitry unique to this device, the resulting combination being capable of performing a reliable optical inspection on transparent or translucent items, which inspection is performed by vertically sweeping the item from different vantage points so as to eliminate any necessity to spin each item as it comes under inspection.

Principal features of the present invention include four basic systems including: a light source, a solid state scanner, a signal processor, and a reject system. The light source, of course, could consist of a number of different arrangements of lights, but preferably includes an arrangement of one or more high intensity lamps positioned so as to direct light therefrom, in turn, onto a light diffusion plate which in turn directs light onto and through certain transparent or translucent items conveyed therepast. Diffusing the light reduces light shadows caused by the lensing affect of bottles having walls of irregular thickness.

The solid state scanner of the present invention is preferably a combination of the perturbation detector and filter-discriminator circuit of our pending applications for U.S. Pat., Ser. No. 381,549 and 381,550. The perturbation detector of the preferred combination mounts a lens thereon to receive light from the light source that has passed through the item, such as a bottle, scanning vertically that item. The light received in each vertical scan is focused onto a scanning array containing photo sensitive devices that pass a signal proportional to the amount of light striking thereon per each vertical sweep. A clock is included to serially interrogate each such photo sensitive device in each sweep so as to produce an output train of pulses therefrom. The filter-discriminator circuit is, in turn, connected to receive that train of pulses from each sweep providing an analysis of deviations in characteristics between adjacent pulses in the train. The deviations are indicative of changes that occur in light intensity reaching adjacent photo sensitive devices; such deviations are checked in successive sweeps and are due to varying light passing characteristics of a defect or foreign object in the bottle under inspection. The analysis of these adjacent pulses in each sweep and in successive sweeps, in turn, produces a signal output made up of pulses that each reflect a change or difference in amplitude between adjacent pulses in that signal train received from the perturbation detector.

The signal processor receives the signal output from the filter-discriminator circuit, analyzing that signal with respect to a bottle window defining that portion of a bottle wherein differences in light transmission properties will conclusively show the presence of a defect. The purpose of the signal processor is to receive the signal output from the filter discriminator circuit, analyzing that signal with respect to the bottle window and defining that portion of a bottle wherein differences in light transmission properties will conclusively show the presence of a defect. In the signal processor a blemish signal must pass through a digital sampler circuit. This circuit samples the output signals of the filter discriminator circuit so as to eliminate transient spikes. The signal from the digital sampler circuit is then passed to a trigger level circuit, the purpose of which trigger level circuit is to discriminate between acceptable and unacceptable signal levels.

Signals passed from the trigger level circuit then travel into an auto correlator wherein all signals that are not location repeated in adjacent sweeps are rejected, thereby eliminating all one time occurrent pulses. The auto correlator, in checking adjacent sweeps, will pass signals located closely but perhaps not exactly the same position in the sweep, providing thereby means for identifying both horizontal and slanting defects.

Optionally included also within the signal processor is a shadow memory circuit that is capable of ignoring any shadows that are attached to the limits of a viewing area, which shadows may indicate the presence of irregularities along the bottle edges and are not necessarily objectionable. From the shadow memory, the signal output is further refined by passage through a trailing edge slicing circuit wherein sweeps indicative of the trailing edge of the viewing window are cut off. The slicing off or culminating of sweeps at the trailing edges of the item being required in that the leading edge portion and the trailing edge portion of the item are generally unreliable for analysis, as those item portions have surface irregularities which show up as shadows and dark spots.

From the trailing edge slicer circuit the signal output passes into a blemish size selector circuit wherein data, defining the minimum acceptable size of a defect or blemish, is programmed into the invention, this programmer circuit, when appropriately set, will cut off or won't pass signals smaller than certain size limits programmed therein.

A reject system is connected to the blemish size selector circuit, receiving signals passed therethrough, which reject circuit, upon receipt of a reject signal, will appropriately set a flip flop. At the edge of the bottle window, as the bottle passes from the scanning area, the flip flop is reset and initiates operation of time delay circuitry that delays signal inputs from connected optical inspection apparatus, providing a single pulse per a defective bottle to energize a kicker to appropriately intersect said defective bottle.

Other circuitry included in the signal processor includes a bottle window circuit, which circuit detects the point at which a bottle is properly located within the viewing area of the scanning device. Another circuit, the sweep window circuit, determines what portions of the bottle will be inspected by each sweep or each scan of the scanning device.

The invention also includes a leading edge slicer circuit for slicing off or culminating the sweeps at the leading edge of the bottle window, in which item leading edge, as in the trailing edge thereof the light transmission properties of the bottles under inspection are less reliable for determining the presence of a defect thereat.

Further objects and features of the present invention will become apparent from the following detailed description, taken together with the accompanying drawings.

DETAILED DESCRIPTION

Figure 1:
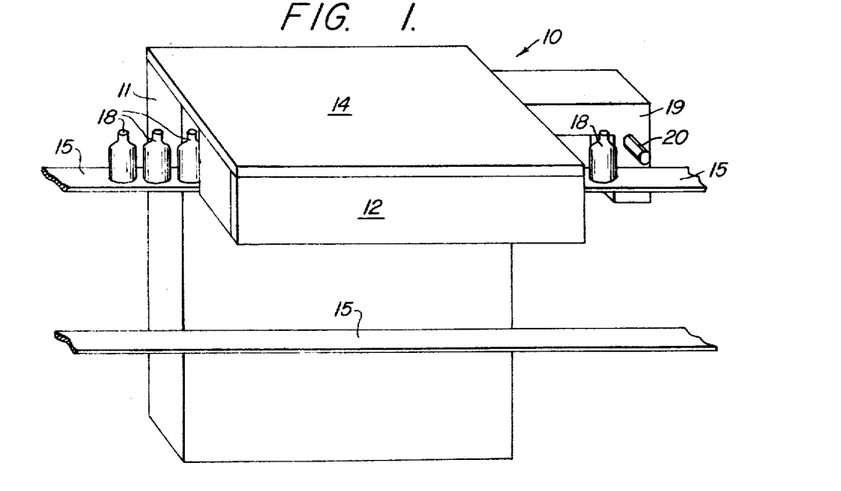
FIG. 1 is a rear perspective view of the optical inspection apparatus of the present invention showing a portion of a continuous belt moving a column or line of bottles therethrough.
Figure 2:
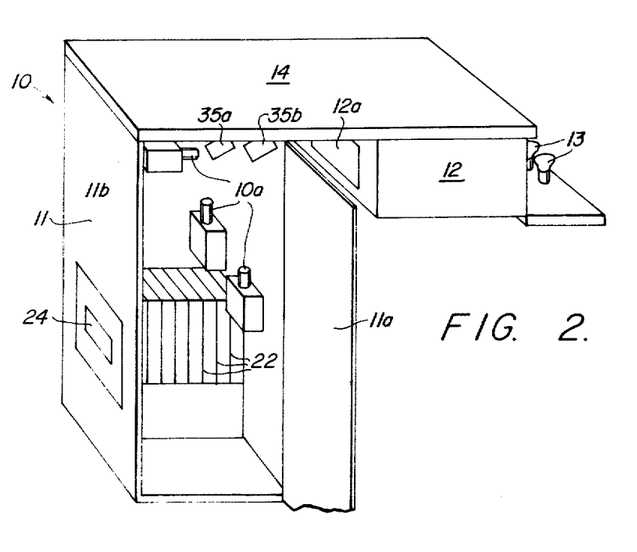
FIG. 2, a profile perspective view of the optical inspection apparatus of FIG. 1 showing door portions thereof in an open configuration, exposing the interior thereof.

Referring now to the drawings:

In FIG. 1 an optical inspection apparatus 10 of the present invention is shown arranged in a first housing 11, wherein the electronics systems thereof are contained, and a second housing 12 wherein, as shown in FIG. 2, is located a light source 13. The first and second housings 11 and 12 are each secured to the undersurface of a hinge member 14 that allows housing 12 to be lifted to provide for each of alignment thereof with respect to a continuous belt 15 that is shown traveling between said housings 11 and 12.

The continuous belt 15 is shown broken at its ends in FIG. 1 and is intended to represent a section of a continuous belt like that commonly used in bottling plants for conveying bottles between cleaning, filling, and like stations. The continuous belt 15 receives and transports a column or line of bottles 18 through the optical inspection apparatus 10 of the present invention wherein an optical inspection is performed on each bottle in turn. Should such passage reveal the presence of a perturbation such as a crack, flaw, foreign object, stone, (a piece of glass bonded to the bottle base or side wall), or a bird swing, (consisting of a piece of glass projecting out from the bottle wall and extending into or across the bottle interior to the opposite wall), then such a detected perturbation will appropriately trigger a delay line circuitry thereafter. The delay line circuitry thereafter activates a kicker device 19, FIG. 1, that extends a piston 20, or could initiate an air blast, to force such defective bottle 18 off from the continuous belt 15.

Shown in the profile view of FIG. 2, a side door 11a of the first housing 11 is opened to expose the housing interior. The housing 11 interior is shown therein to contain a number of printed circuit boards 22, whereon the various electrical system to be described in detail later herein are arranged. A control panel 24 is fitted into a front panel 11b of the housing 11 connecting to the components of the circuit boards 22. The control panel 24 is shown also in an expanded view of FIG. 3, providing thereon toggle switches 25 that each activate one of the arrangement of optical inspection apparatus 10 of FIG. 5. Additional to the toggle switches 25, the control panel also mounts status lights 26, labeled L, C, and R, that are individually connected to each of three separate optical inspection apparatus 10, of FIG. 5. The L, C, and R status lights indicate, when illuminated, that the particular optical inspection apparatus 10, has sensed a perturbation of sufficient magnitude to activate the trigger circuitry of the invention. Located directly below the status lights 26 are control potentiometers 27, that are marked as Trig Level, which potentiometers are manually positioned by appropriately turning screw portions thereof for setting in data to components of the printer circuit boards 22. Sensitivity setting means for controlling the minimum blemish size allowable in a bottle under inspection, are programmed into said circuitry by appropriately operating pairs of thumbs wheel switches 28a, 28b, and 28 c, that are shown arranged below the toggle switches 25.

Figures 4, 5:
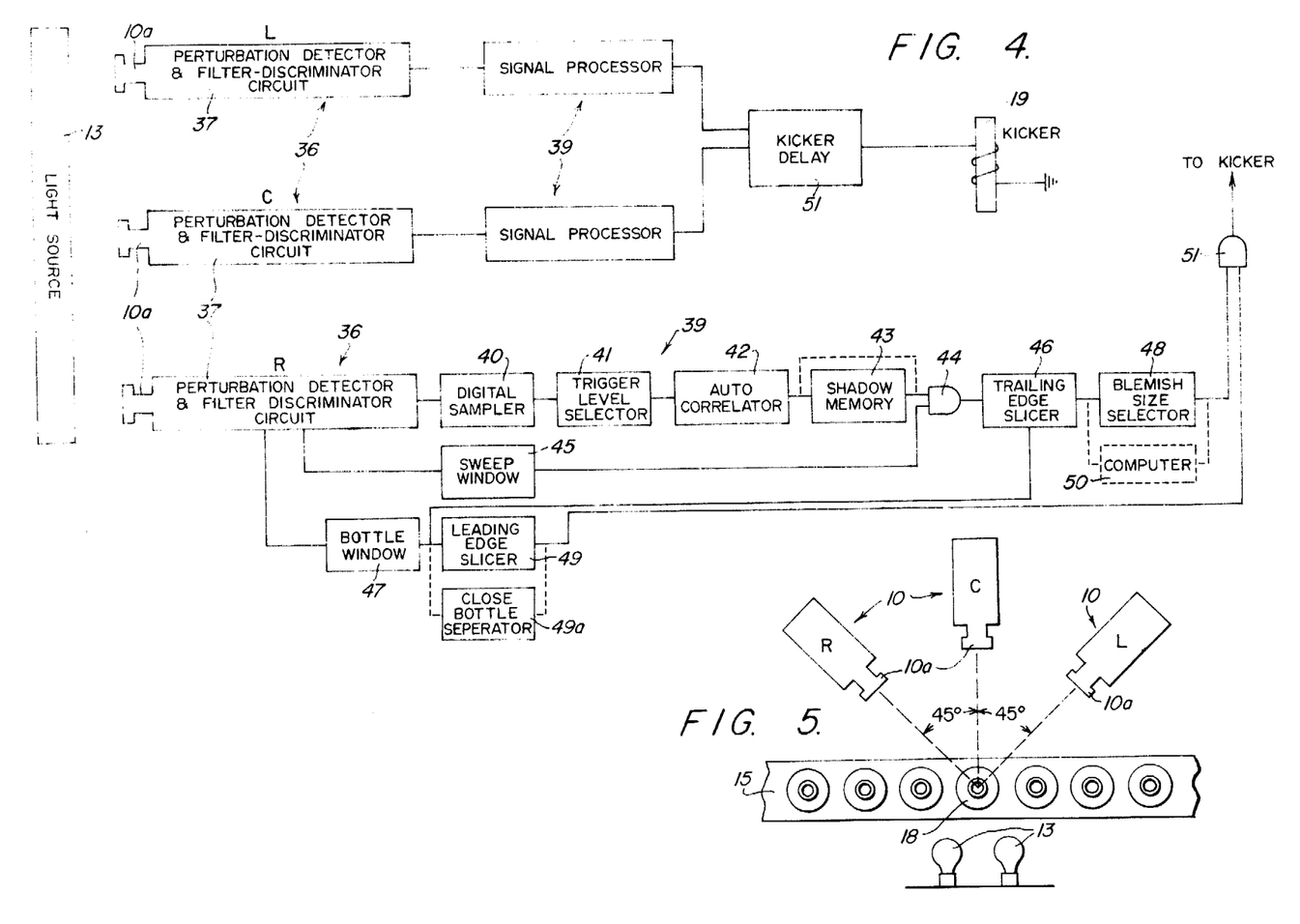
FIG. 4, a block schematic diagram of three optical inspection apparatus of the present invention, showing the paths of signal flow through the various systems thereof.
FIG. 5, a preferred viewing arrangement of perturbation detector portions of three optical inspection apparatus of the present invention.

Preferably, as shown in FIG. 5, three optical inspection apparatus 10 of the invention are arranged to simultaneously view each passing bottle 18. Optical viewing portions of each of the apparatus 10 are optimumly spaced apart at approximately 45° from one another, one such optical viewing portion identified as C indicating center, with the other optical viewing portions identified as L and R respectively indicating left and right from center.

Figure 3:
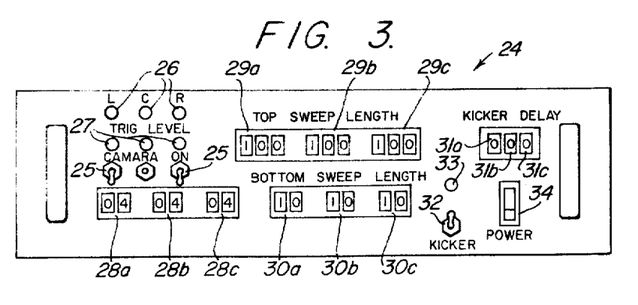
FIG. 3, a frontal view of the control panel of the optical inspection apparatus of FIG. 2.

Included alongside the described status lights 26 and control potentiometers 27, in the center of the control panel 24, are arranged sets of thumb wheel switches 29a, 29b, and 29c, that are identified thereabove as top sweep length. These sets of thumb wheel switches connect to the above-mentioned individual optical inspection apparatus, each set providing a means for programming desired cut-off points or top of a length of sweep section to be analyzed. These thumb wheel switches can be programmed to accommodate different sizes of bottles 18 to insure that the required inspection will be made of only critical bottle areas below the top portion thereof.

Below the top sweep length thumb wheel switches are arranged pairs of thumb wheel switches 30a, 30b, and 30c identified thereabove as bottom sweep length. Each such pair of switches connecting to circuitry for controlling or cutting off the bottom of the vertical sweep. An operator by turning appropriately the thumb wheel switches 30a, 30b, and 30c can thereby establish when the sweep above the bottom of the bottle 18 will first be analyzed and with thumb wheel switches 29a, 29b, and 29c can program the point where analysis of the sweep will be discontinued. Operation of thumb wheel switches 29c, 29b, 29c, 30a, 30b, and 30c, therefore provide a means whereby an operator can program sweep limits into the L, C, and R inspection apparatus 10 to establish the top and bottom limits of a bottle window.

Alongside the sets of top sweep length thumb wheel switches 29a, 29b, and 29c, located on the opposite side of the control panel 24 from the L, C, and R status lights, are arranged single thumb wheel switches 31a, 31b, and 31c, that are identified as kicker delay switches. These thumb wheel switches provide for programming of a delay from the time the apparatus of the invention locates an unacceptable perturbation in a particular bottle 18, until the kicker 19, FIG. 1, is operated to extend the piston 20, or expell an air blast, to force that defective bottle from the passing column or line of bottles.

Below the kicker delay thumb wheel switches 31a, 31b, and 31c, is arranged a kicker toggle switch 32, and a status light 33 therefore. The kicker 19 is electrically connected to the switch 32, such that the switch must be appropriately positioned to allow for the operation of said kicker. Even without the kicker switch being so positioned, should a perturbation of sufficient magnitude be sensed by the invention, the kicker status light 33 will be temporarily illuminated to indicate that the kicker should have operated at a particular time. A panel power switch 34, shown as a circuit breaker type of switch, is included on the control panel 23, the operation of which switch provides power to operate the described components on the panel.

As shown in FIG. 5, it is preferable to arrange three optical inspection apparatus 10 of the invention such that lens portions 10a of each are pointed to receive light from light source 13, after said light has passed through a single bottle 18. The optical inspection apparatus 10, wherein identified as L, C, and R, indicating left, center, and right, taking a normal line off from the continuous belt 15 through a bottle 18 as the center, are spaced at approximately 45° intervals off the normal line through the bottle 18, intersecting the C optical inspection apparatus.

The optical inspection apparatus 10 of the present invention, as has heretofore been mentioned, arranged with other like optical inspection apparatus are preferably contained in the single housing 11, each such apparatus having lens 10a secured to one end thereof. Due to space limitations within the housing 11, as shown in FIG. 2, the lens and related components thereof, are preferably not arranged alongside of one another. Rather, mirrors 35a and 35b are preferably aligned therein so as to reflect light coming through a window 12a of the housing 12, after that light has passed through a bottle. The light so entering, strikes said mirrors, and is reflected into the strategically positioned 10a.

In FIG. 4 is shown a block schematic view of each of the L, C, and R optical inspection apparatus 10 of the present invention, said apparatus each consisting of four basic systems. Commencing at the left hand side of FIG. 4, the first basic system is the light source 13, already described herein. Next is a solid state scanner 36, arranged to receive light in its lens 10a from the light source 13 after that light has passed through an item under inspection, like one of the bottles 18. Light entering said lens 10a after having passed through a bottle, or other transparent or translucent item, is process and interpreted within a perturbation detector, and a filter-discriminator circuit identified as 37. The perturbation and detector and filter-discriminator circuit 37, as already mentioned herein, are preferably like those of our aforementioned pending applications for United States Patents.

The solid state scanner scans vertically to produce, as the output therefrom, digital signals whose deviations in characteristics are proportional to the rate of change in light intensity passed through different portions of the item under inspection. A perturbation formed as a crack, flaw, bird swing, stone, or foreign object within the item tends to pass light differently, passing either less light or gathering light thereto, compared with normal portions of the item. A train of pulses, with some pulses therein having different heights or amplitudes, thereby indicates the presence of a perturbation.

Within the solid state scanner the signal input passes into the filter-discriminator portion thereof wherein adjacent pulses are compared to produce, output pulses reflective of any changes in amplitude of adjacent pulses. The output from which filter-discriminator then passes to a signal processor 39, wherein the pulses reflective of differences in adjacent pulses indicative of the presence of a blemish, foreign object, or like perturbation within the bottle, are sorted from all other signals, such as random noise and the like. In the L and C optical inspection apparatus 10, the signal processor 39 is shown only as a single block, whereas, in the R optical inspection apparatus the component assemblies of the signal processor 39 are individually identified.

Referring to the R optical inspection apparatus 10, FIG. 4, signals from the Solid State Scanner 36 pass therefrom into a digital sampler 40 wherein undesirable portions of the signal are eliminated. Signals passed from the output of the digital sampler then travel to a trigger level selector 41. The trigger level selector 41 receives signals of varying amplitude from the digital sampler with only signals having a cetain amplitude above a predetermined value passed therethrough, this value being dependent upon the setting of the trigger level adjustment on the front panel 24, FIG. 3. When the trigger level selector 41 is triggered, it outputs a digital pulse, which digital pulse is sent to the auto-correlator 42 wherein all signals that are not location repeated in adjacent sweeps are rejected. For a signal to pass the auto-correlator 42, it is therefore necessary that it is repeated in at least two adjacent sweeps wich requirement eliminates the passage of stray signals or noise. A shadow memory 43 is preferably included with the present invention to receive signals passed from the auto-correlator 42 for distinguishing between acceptable and unacceptable shadows on the item under inspection. Depending however upon the type and size of the item under inspection, the shadow memory 43 may not be required, and the shadow memory is therefore shown as having a broken line arranged to by-pass the circuit indicating that the shadow memory is an optional inclusion.

With the shadow memory 43 included in the invention, the circuit will provide that signals from a blemish or shadows viewed by the scanner that are connected to the leading or trailing edge of the bottle to thereby eliminate from further passage through the invention signals produced by irregularities at the leading and trailing edges of the bottle. The signal from the shadow memory 43, or, if the shadow memory 43 is not incorporated as part of the invention, from the auto-correlator 42, is ANDed at gate 44 with output of a sweep window 45. Should a blemish signal fall within the area of the bottle that is to be analyzed, which area is determined by the sweep window 45, the AND gate 44 will output a signal to a trailing edge slicer 46. The sweep window 45 is established by an operator appropriately setting the top and bottom thumb wheel switches 29C and 30C located on the described control panel 24. The trailing edge slicer 46 in turn uses a signal from a bottle window 47 in order to blank out all signals indicative of the last few sweeps of the bottle.

In addition to the signal from the bottle window 47 traveling into the trailing edge slicer 46, said signal also travels into a leading edge slicer 49 wherein the first few sweeps of the bottle window are eliminated from consideration as said sweeps, like sweeps eliminated by the trailing edge slicer 46, are deemed to probably contain unreliable data. Linked optionally, as shown by the use of broken lines, to both sides of the leading edge slicer 49, is a close bottle separator 49a. The close bottle separator 49a is a means for distinguishing between closely spaced items and inspects the next area of the bottle to determine the demarcation thereof.

The trailing edge slicer 46 provides a means whereby any blemish signal that occurs within the last few sweeps of the bottle is eliminated, which blemish signals like the sweeps eliminated by the leading edge slicer 49 are unreliable as data as they could indicate the presence of shadows and irregularities only, and are therefore eliminated from consideration in the trailing edge slicer 46. A blemish signal that is passed from the trailing edge slicer, 46, travels into a blemish size selector 48, which selector 48 is programmed manually by an operator who dials in appropriate settings of the thumb wheel selector 28c on the control panel 24, that manual programming establishing the minimum size of blemish that will be rejected.

Optionally, a computer 50, shown connected by broken lines to each side of the blemish size selector 48 can be included with the circuit of the signal processor 39. Should such a computer 50 be so installed, it can be used as a means for comparing the output data from the optical inspection apparatus 10 against a known model to enable the close calibration of the invention.

Only signals processed through the signal processor 39 are defined as rejectable blemishes, and providing those signals pass also through the trigger level selector 41, the auto correlator 42, shadow memory 43, and blemish size selector 48 and are sequenced with a signal from the bottle window 47 and leading edge slicer 49, they will ultimately energize a kicker delay 51 of the fourth basic system. The kicker delay 51 is programmed by the thumb wheel switches 31a, 31b, and 31c providing thereby time limit data for each optical inspection apparatus L, C, and R which time delay holds a reject command in memory a sufficient time period to allow the bottle or other item detected to be defective to move to the location of the kicker 19, which kicker operates a piston 20, or blast of air, to remove that defect item from a line of other like items.

As has already been mentioned herein, the solid state scanner 36 of each of the optical inspection apparatus 10, includes a perturbation detector and filter-discriminator circuit 37 like those devices and circuits described in our aforementioned pending applications for United States Patents. The light source, it should be understood, is an arrangement of standard type high intensity lamps, and so will not be described in further detail herein. The kicker delay 51 and kicker 19, it may be assumed are, standard readily available components and therefore will not be described in further detail herein. The signal processore 39, and the component assemblies thereof, will be described in detail immediately following, which description will be made with reference to the circuit diagrams of FIGS. 6(A) and 6(B).

Figure 6A:
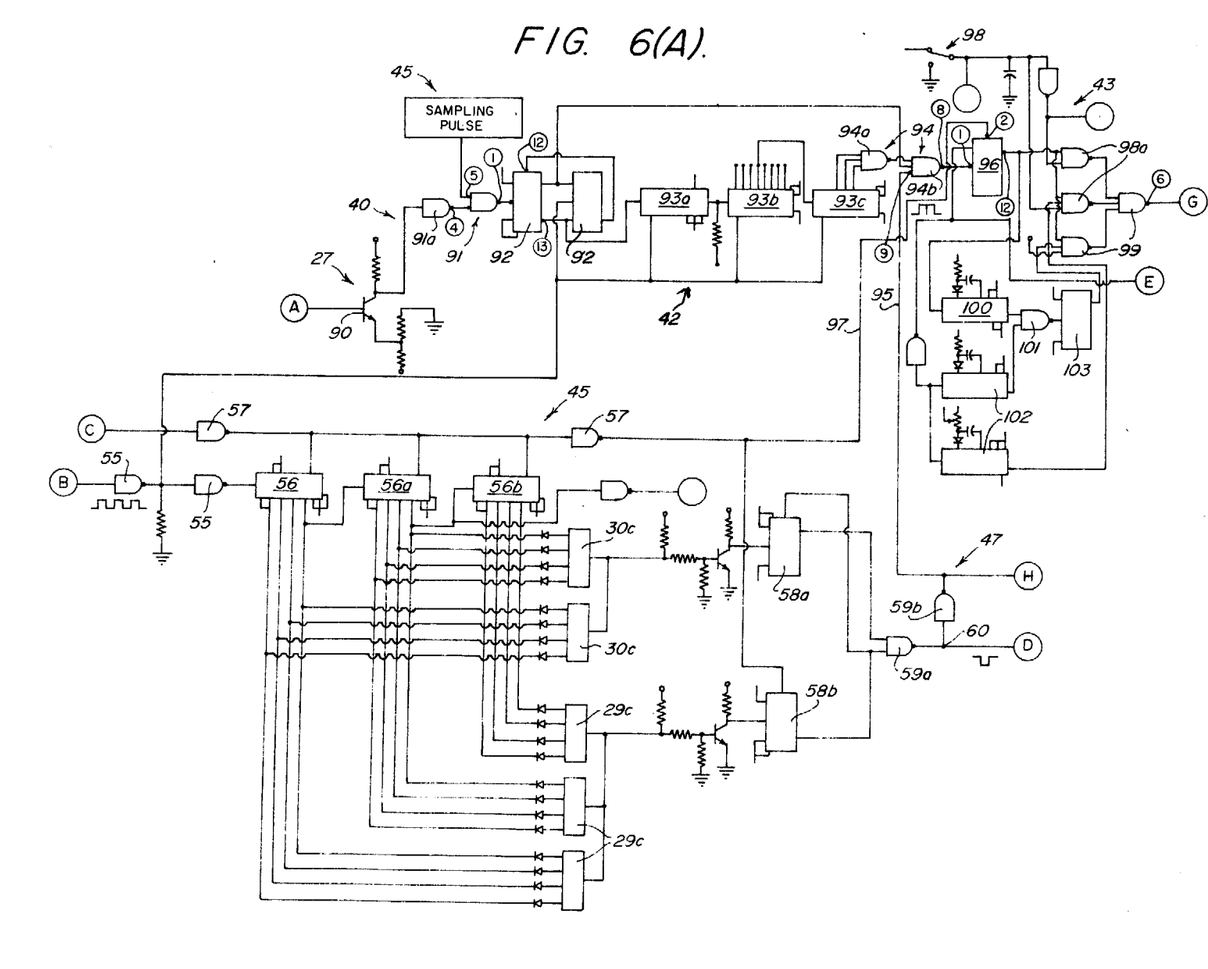
FIGS. 6(A) and 6(B), circuit diagrams of certain of the systems of the optical inspection apparatus of the present invention.

As described with respect to FIG. 4, parallel signal paths are provided at the input to the signal processor 39. Referring to FIG. 6(A), those signal inputs consist of the signal from the perturbation detector and filter-discriminator circuit 37 that enters the digital sampler 40 at point A, and clock pulses from the perturbation detector that enter the sweep window point B. The clock pulses entering at point B are shown to have a square wave form, traveling into a phase interter 55, shown in two sections, and then into a first integrated circuit decade counter 56. Prior to such signal passage however, a begin sweep pulse, entering at point C must be introduced through an integrated circuit 57. The start pulse is therein inverted, passing to the first decade counter 56 and to other decade counters 56a, and 56b, resetting to zero those counters, traveling through a line 57a to reset and a flip flop 58b before the beginning of each sweep. Once reset, the decade counters 56, 56a, and 56b begin counting the clock pulses. Receipt by the decade counters of a preset number of clock pulses is required prior to signal passage through theswitches 29c and 30c.

After a given number of such clock pulses are received, a signal is thereafter passed to flip flop 58a through 30c, setting that flip flop.

The output of 58a, which is a high signal is passed through integrated circuit halves 59a and 59b to one input of an AND gate 94b, allowing the gate 94b to pass signals from the auto-correlator 42 as will be explained in detail later herein. The settings of switch 30c thereby determines the lower limit on the sweep wherein the signals are analysed.

The setting of flip flop 58a occurs at the beginning of the sweep window. When 56 and 56a and 56b count to the preset value of the switch 29c, flip flop 58b will receive a pulse and will be set, at which time the output of 58b will change from a high state to a low state. This low state will reset 58a and will disenable IC half 59a, thereafter IC half 59b will invert the resultant high signal from IC half 59a and will cause a low signal on one input of gate 94b. This low signal will, in turn, disenable gate 94b, thus blanking out all further signals from the auto correlator 42. The setting switch 29c thereby indicates the end of the bottle window.

Figure 6B:
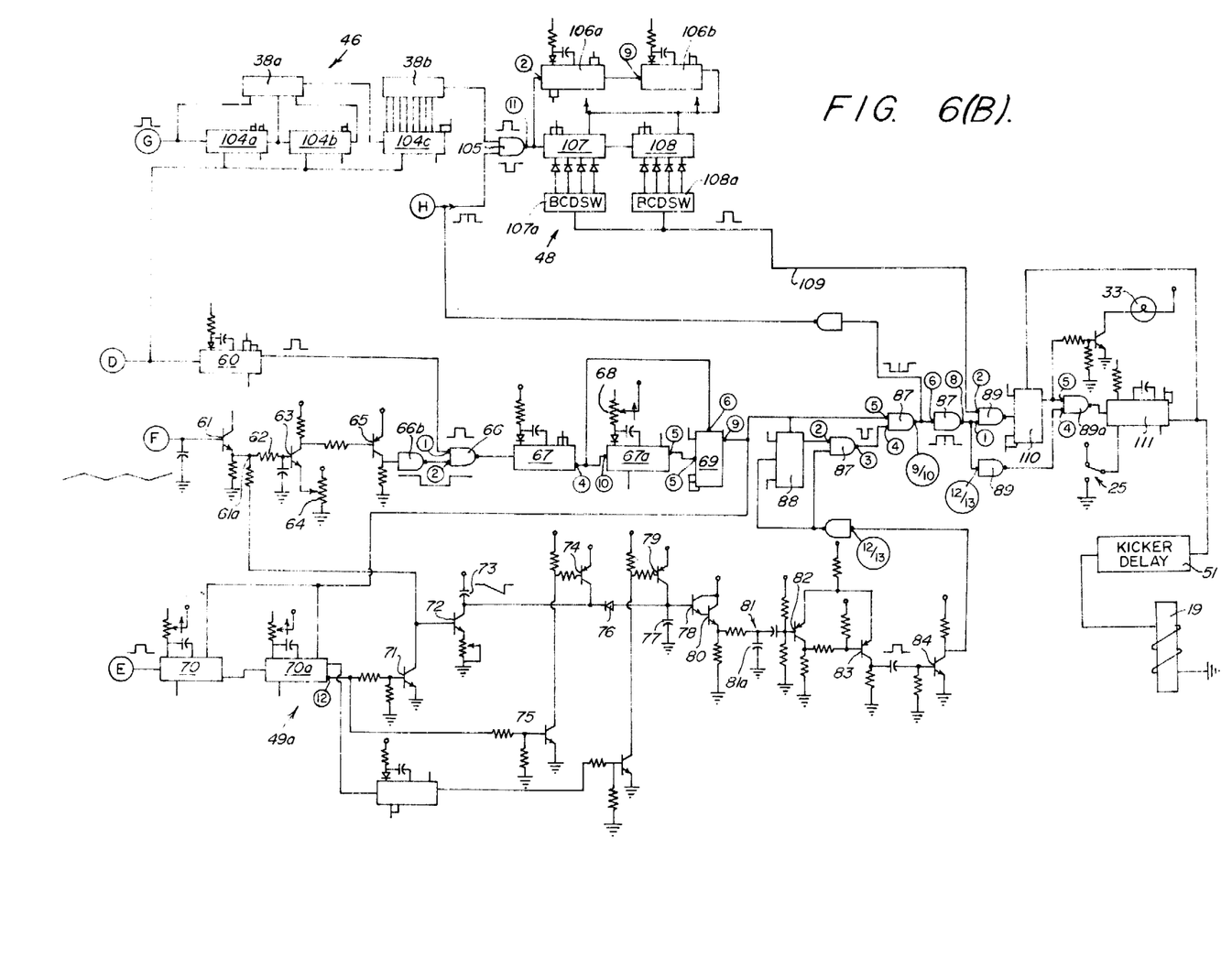

Point D is shown in both FIGS. 6(A) and 6(B), indicating a continuous signal flow therebetween, as with other points that have been and will be mentioned herein. Pulses from the sweep window 45 entering at point D in FIG. 6(B), enter a monostable multivibrator 60 that triggers off the leading edge of the pulses from the sweep window 45 as the leading edge slicer 46. The monostable multivibrator 60 is adjusted to time out shortly before the end of the sweep, the output therefrom connection to one input of an AND gate 66. The AND gate 66 is thereby conditioned during the period of time commencing with the beginning of sweep window until shortly before the end of sweep.

An input shown at F on FIG. 6(B) is a sample and hold signal from the perturbation detector. The sample and hold signal indicates the light level at each photo-sensitive device, not shown, in the scanner 36. When the light level is flat, or, in other words, when all of the photo sensitive devices are of an equal amplitude the signal at F will approximate a DC level. The input to F is buffered by transistor 61 and amplified by transistor 63 with the output of transistor 63 passing to a switching transistor 65 which is also an inverter. The output from the switching transistor 65 is then inverted by an integrated circuit 64 and passed to one input of an AND gate 66. When there is no bottle present in the viewing area of the perturbation detector, all of the photo sensitive devices on the scanner will indicate a high light lever outputting a high voltage therefrom. The voltage on F at that condition will be very nearly a DC voltage in the range of from 4 to 7 volts. This DC voltage will produce a low voltage level at pin 2 of AND gate 66. When a bottle is in the viewing area of the perturbation detector, at least some of the photo sensitive devices will indicate a lower light level, which indication is due to the bottle blocking the light, thereby causing a low voltage in at least some portion of the signal at F of FIG. 6(B) which condition, in turn, will cause pin 2 of AND gate 66 to go high. Should pin 2 of gate 66 go high while pin 1 of 66 is high, 66 will output a pulse.

It can be seen that pin 2 of 66 will remain high until the bottle has passed out of the viewing area of the perturbation detector and therefore during this time, 66 is enabled. It must be remembered that at the beginning of each sweep that multivibrator 60 is triggered and, therefore, mulltivibrator 60 will output a pulse on every sweep. While a bottle is in the viewing area of the perturbation detector AND gate 66 will therefore output at least one pulse per sweep.

A signal outputted from AND gate 66 travels to a monostable multivibrator 67 that is a retriggerable multivibrator receiving signals for as long as AND gate 66 outputs pulses on each scan, multivibrator 67 remaining thereby in a meta-stable state. When multivibrator 67 receives its first pulse the output, which is on pin 4 thereof, will go high. This high signal enables a flip flop 69 and it also triggers a multi-vibrator 67a. Multivibrator 67a times out in a short period of time. The trailing edge of the pulse therefrom sets flip flop 69, the output of which flip flop 69 being the bottle window.

The output from multivibrator 67a goes high when the bottle first comes into the viewing area of the perturbation detector. However, the output of flip flop 69 does not go high until multivibrator 67a has timed out, and, therefore, multi-vibrator 67a effectively cuts off the leading edge of the bottle window. It is desirable that multivibrator 67a cut off the leading edge of the bottle window such that the circuitry can ignore the perturbations caused by shadows and irregularities in the bottle leading edge. When the bottle has passed out of view of the perturbation detector, all photo-sensitive devices will output high signals, this will result in pin 2 of AND gate 66 remaining in the low state. Thereafter, the multivibrator 67 will receive no more triggering pulses, and after 67 has timed out, the output therefrom will return to the normal low state, resetting the output of a flip flop 89 to the low state, and terminating ends of the bottle window.

The signal passing from the flip flop 69, out from pin 9 thereof, constitutes a modified bottle window that has had the front end thereof sliced off. Optionally, depending on the requirements of the column of bottles 18 under inspection, a close bottle separator 49a, FIG. 6(B), can be included to modify the bottle window signal received at the flip flop 69. The purpose of the close bottle separator 49a is to provide an interruption in the bottle window insuring that there will be bottle window spacing for each bottle even though the bottles are arranged very close together. This purpose is accomplished by monitoring that portion of the signal that is near the neck of the bottle 18. Assuming the presence of a signal begin sweep pulse entering at point E, FIG. 6(B), that pulse will trigger a monostable multivibrator 70, a second half 70a thereof triggered by the trailing edge of monostable multivibrator 70, which monostable multivibrator 70a generates the window that will let the described sample and hold video, entering at point F, pass a transistor switch 71 to drive a pseudo constant current generator 72. Driving of the pseudo constant current generator 72 takes place during the time that the output pulse on pin 12 of monostable multivibrator 70a is false. A constant current source allows a capacitor 73, that connects to the collector of the pseudo constant current generator 72, to meanwhile be charged at a constant rate as a function of the voltage present on its base, generating thereby a ramp signal that is shown as an output therefrom.

During the time that the ramp signal is not being generated a clamping transistor 74, driven by a signal from a switch 75, keeps the collector of the pseudo constant current generator 72 at a +V. The ramp signal peak is felt through a diode 76 that acts as a blocker, to a capicitor 77 connected thereto. The capacitor 77, the base of transistor 78, and the collector of transistor 79 all follow the signal that is shown on the collector of the flip flop 72 to its most negative point. The ramp signal is thereby followed down to a certain negative level and then, when the transistor 74 dumps, the anode of diode 76 becomes back biased. The emitter of transistor 78 is connected to the base of a transistor 80, in a darlington transistor configuration in conjunction with diode 76, capacitor 77, and switch 79 acts as a sample and hold circuit.

The output signal from transistor 80 then goes through a resistance-capacitive filter network 81 wherein slow changing signals, which represent the neck of a bottle 18 under inspection, are imposed on the base of a transistor 82. Transistor 82, along with a transistor 83 connected thereto, act as a Schmitt trigger, which Schmitt trigger, as the signal input thereto goes negative, passing a large current through the emitter to base of transistor 82 to discharge a capacitor 81a. So arranged, as the signal on the up stream side of the capacitor 81a starts to go positive, the positive going signal shuts off transistor 82. The collector of transistor 82 provides a pulse that switches transistor 83 to an on state causing the Schmitt trigger effect producing a pulse output that is shown passing from the collector thereof. The pulse emitted from the collector of the transistor 84 is narrowed by its input capacity coupling traveling therefrom onto pin 12/13 of an integrated circuit 87 whereat it is inverted. Its output trailing edge then trips flip flop 88 which restrains the first signal seen at the collector of 84 in a bottle window from appearing at pin 3 of a gate portion of integrated circuit 87. An output signal traveling from a pin 3 of the integrated circuit 87 enters pin 4 thereof and combines with the bottle window signal that has passed from the flip flop 69 and has entered the integrated circuit 87 at pin 5. A signal output is thereby provided at pin 6, which signal is shown as having a notch standing in the bottle window. The bottle window and notch are then inverted upon passage through pins 9/10 and 8, of the same integrated circuit 87. The signal thereafter existing pin 8 of the integrated circuit 87 is then imposed on pins 1, 12, and 13 of an integrated circuit 89, that integrated circuit 89 receives also, at pin 2 thereof, a signal output from the blemish size selector 49, which signal generation will be described in detail immediately following.

Commencing at input point A, which point, as has already been mentioned herein, receives a signal input from the perturbation detector and filter-discriminator circuit 37, which signal has been modified by passage through a digital sampler circuit, not shown, a trigger level potentiometer, not shown, and a tunnel diode, not shown, that tunnel diode providing a trigger pulse at a given input pulse amplitude. That signal input then travels to the base of a switch transistor 90, which switch transistor, along with said potentiometer and tunnel diode make up the trigger level selector, shown at 27 on the control panel 24. The collector of the transistor 90, in turn, outputs pulses that have been accepted as being great enough to pass therethrough. Signals passing from the transistor 90 then travel into a first half 91a of an integrated circuit 91.

The signal output from the integrated circuit first half 91a is ANDed at pin 4 with a sampling pulse entering at pin 5 thereof, the resultant being a precise signal that is then introduced onto a flip flop 92 at pin 1 thereof. Within flip flop 92 the signal is conditioned such that a signal output on pin 12 thereof goes true and the output on pin 13 thereof goes false, so as to provide a negative going pulse to the first stage of a series of integrated circuit shift registers 93a, 93b, and 93c that, along with a part 94a of an integrated circuit AND gate 94, make up the auto correlator 42.

The auto correlator 42 separates or rejects random noise or signals generated by inconsequential flaws that may be present in the signal, which function is accomplished by the auto correlator checking adjacent sweeps. If in such an inspection, a pulse is sensed in one particular sweep that sensing is passed into the integrated circuits 93a, 93b, and 93c for checking against the next sweep. Assuming that pulse is sensed in the next sweep it will be passed through the AND gate 94. If the signals are not repeated, the integrated circuit 94b will not be triggered and the pulse not passed. Continued pulse sensing will, of course, be passed, which pulses may be off-set with respect to each other, such as a sensing at a count 35 in one sweep which is repeated at a count 35 of the next sweep, and yet those pulses, though not immediately adjacent, will still be passed. This characteristic allows for the sensing of a blemish that is sloped, with pulses reflective thereof occurring at different periods in each sweep.

At the second half 94b of the integrated circuit AND gate 94, the output from the auto correlator 42 is ANDed with the output of the sweep window 47 through a connecting line 95 that anters that integrated circuit half 94b at pin 9. The product of the integrated circuit half 94 then traveling out from pin 8 thereof onto pin 1 of a flip flop 96 that is part of the shadow memory 43. The flip flop 96 also receives, as a reset input at pin 2 thereof, and a begin sweep pulsed that travels also into decade counters 56, 56a, and 56b through line 97. The shadow memory 43, when activated by closing switch 98, provides a means for ignoring as a legitimate signal any pulse inputs during the first five sweeps adjacent to the leading edge of the bottle window that has been modified, as described, by the leading edge slicer. Such pulses in said first five sweeps being interpreted as shadows and therefore are not read.

The flip flop 96, upon receiving the reset pulse through line 97 is triggered by input signals on pin 1 thereof, after which the signal will be passed from pin 12, provided it is not identified, as described, as a shadow. Should it be determined that a shadow is present, that presence will be ignored for approximately 50 sweeps whereafter it could reasonably be concluded that the bottle is defective and the signal will be passed.

Signals passed from pin 12 of the flip flop 96 travel into gates 98a and 99, and into a monostable multivibrator 100 whose output is ANDed by gate 101 with a shadow memory cut off signal passed thereto from another monostable multivibrator 102, providing thereby a period for the shadow memory to appear. The ANDed signal from gate 101 then passes to a flip flop 103 that produces a signal output that has been modified to be time dependent, providing thereby a signal period wherein shadow functions must occur. The signal produced, as described exists the gate 99 at pin 6 thereof, travels to point G shown in FIG. 6(A), which point G is also shown and should be interpreted to be the same point in FIG. 6(B), that signal traveling into a portion of the trailing edge slicer 46.

From the point G in FIG. 6(B), the signal passes into integrated circuit shift registers 104a, 1104b, and 104c, which shift registers are manually set with certain delay data by thumb wheel switches 38a and 38b that are shown only in the schematic of FIG. 6(B). By operation of the switches 38a and 38b an operator programs the trailing edge slicer 46 to slice off a given number of sweeps of the trailing edge portion of the bottle window. That bottle window, described earlier herein as having a spike arranged therein, is present at point H in FIGS. 6(A) and 6(B). The signal produced in the trailing edge slicer 46 and that signal output from the bottle window are ANDed together in an AND gate 105. Any signal resulting from that ANDing appearing at AND gate 105 pin 11 and is only legitimate data as far as the trailing edge slicer 46 is concerned.

Next, the signal appearing on pin 11 of the end gate 105 is passed to the blemish size selector 48 wherein the input signal is checked to determine whether or not the signal represents an acceptable or rejectable blemish. This function is accomplished by passing that signal on to pin 2 of a monostable multivibrator half 106a and to the input of a BCD switch counter 107, BCD counters 107 and 108 will count the number of blemish pulses received, and, when that number reaches the preset value of the BCD switches 107a and 108a, the BCD switches 117a and 108a will output a pulse. Monostable multivibrator 106a is retriggerable, to adjust the monostable multivibrator 106b such that it will time out if a signal is not received within five sweeps of the preceding signal. When monostable multivibrator 106a times out it triggers monostable multivibrator 106b, which triggering resets BCD counters 107 and 108. So positioned, if there has been a period of five sweeps when no signal was received BCD counters 107 and 108 will be reset to zero and, if their count had not reached the predetermined setting of the BCD switches, 107a and 108a, no blemish pulse would be passed on. In other words should a signal representing a blemish be seen only by sweeps of a lesser number than the number programmed by the thumb wheel switches 28c, it will not be accepted as a legitimate signal and further signal transfer will be discontinued.

Signals passed from the blemish size selector 48 pass through line 109 and onto pin 2 of the gate 89. The gate 89 thereafter ANDs the signal input from the bottle window therewith, passing, if the signal entering at pin 2 occurs during the period of the bottle window 47. That signal trips a flip flop 110, which data conditions are held in memory until the end of the bottle window. Thereafter, when the end of the bottle window occurs, and an AND condition exists at pins 4 and 5 of an integrated circuit 89a, that condition will trip a monostable multivibrator 111.

Assuming that the appropriate camera switch 25, shown in FIG. 6(B) and on the control panel 24 of FIG. 3, is positioned to on, the signal so passed to the integrated circuit 111 will cause that monostable multivibrator to trip and to generate a pulse which goes out from pin 1 to appropriate kicker delay circuits 51. The kicker delay circuits 51 consist of a common arrangement of digital delay line switches and shift registers, that provide the signal with a time delay prior to the signal passing to the kicker 19. The kicker 19, as already described herein, will extend a piston 20 therefrom, FIG. 1, after the appropriate delay, to intersect the path of the bottle 18 deemed to be defective, or may produce a blast of air to force that bottle 18 out of the column of bottles conveyed on the continuous belt 15. Additionally, energizing the integrated circuit 110 also energizes the lamp 33, shown in FIG. 6(B) and on the control panel 24 of FIG. 3, which illuminates to show that a kicker or reject signal has been received.

While not shown in the schematics of FIGS. 6(A) and 6(B), it should be understood that the kicker toggle switch 32, described herein with respect to FIG. 3, is connected to receive kicker signals such that those signals will not pass to said kicker unless the switch 32 is positioned appropriately.

While reference has specifically been made herein to a preferred use of the present invention for detecting flaws, blemishes, foreign objects and like in transparent or translucent bottles, it should be realized that the present invention could easily be adapted for use to perform inspection function on a number of kinds and types of items, some of which items may be reflective rather than transparent or translucent. It should therefore be understood that the present disclosure should not be taken as limiting the potential uses of the invention.

Further, while a digital computer has not been shown as a required inclusion in the description of circuit diagrams FIG. 6(A) and 6(B), it should be understood that a digital computer could be included therewith to more accurately define the limit of the bottle under inspection. Such a computer would be programmed by sending a test bottle down the conveyor belt, which test bottle has defined viewing limits marked thereon, so that the computer can put into memory the viewing limit marks and any perturbations included in the test bottle. Such a test bottle would therefore be used as a model and its optical characteristics placed into memory by the computer for comparison against bottles to be tested. All items on the conveyor belt would therefore be inspected by the optical inspector which inspection would then be compared to the model in the computer.

Although a preferred embodiment of out invention has been herein disclosed, it is to be understood that the present disclosure is made by way of example and that variations are possible without departing from the subject matter coming within the scope of the following claims, which subject matter we regard as our invention.

We claim:

1. An optical inspection apparatus, comprising in combination:

a housing;

a light source within the housing for illuminating an object capable of transmitting light therethrough;

means for transporting said object through the housing to be inspected therein;

a solid state scanning means adapted to sweep vertically to receive light transmitted through the object, said scanning means having the capability to generate signals having deviations in characteristics proportional to the rate of change in light intensity received therein after passing through said object under inspection;

circuitry means for providing signal suppression except when an item under inspection is in a preferred viewing area, providing thereby a window through which the signals from the scanning means are analyzed, said window representing successive portions of the object under inspection wherein the presence of changes in light transmission characteristics are indicative of a defect in the object;

means for analyzing the signal from said circuitry means to determine the presence of a defect in the object under inspection;

timer means for delaying signals transmitted from the analyzing means and for holding said signals a period of time until an object determined to have a defect passes out of the range of the scanning means; and means for receiving signals from the timer means and for removing the object determined to have a defect from the transporting means.

2. An optical inspection apparatus as recited in claim 1, further including a defect size limit programming means for manually programming acceptable defect size limits into the invention, which means receive signals produced by said solid state scanning means after said signals have been analyzed during the period of the window, passing those signals that are greater than the programmed minimum size limits.

3. An optical inspection apparatus as recited in claim 2, including auto correlator means for rejecting all signals passed thereto that are not location repeated in two adjacent sweeps, rejecting thereby all one time occurrent pulses.

4. An optical inspection apparatus as recited in claim 3, wherein means are included for sensing pulses that are off-set with respect to each other in adjacent sweeps, thereby allowing the sensing of a sloping blemish.

5. An optical inspection apparatus as recited in claim 1, further including shadow memory means for providing circuitry that will ignore a shadow generated at the irregular surface of the edge of the item under inspection.

6. An optical inspection apparatus as recited in claim 1, further including close item separator means associated with the means for shaping a window, which close item separator means monitors that portion of the signal that is near to the neck of items under inspection, determining thereby the delineation between items that are adjacent to one another.

7. An optical inspection apparatus as recited in claim 1, further including a computer means for defining against a model the viewing limits of the optical inspection apparatus.

8. An optical inspection apparatus as recited in claim 1, wherein the means for passing an item to be inspected through said housing consists of:

a bottle conveyor apparatus consisting of a continuous belt traveling through said optical inspection apparatus.

9. An optical inspection apparatus as recited in claim 1, further including means for generating a signal to activate the circuitry means upon receipt of a signal from the solid state scanning means that a reduction in light level falling thereon has occured.

10. An optical inspection apparatus as recited in claim 9, further including means for terminating the window upon receipt of a signal from the solid state scanning means that the light level falling thereon has increased due to the item under inspection passing from the viewing area of the optical inspection apparatus.

11. An optical inspection apparatus as recited in claim 1, further including means for selectively ignoring information contained in a certain number of vertical sweeps made proximate to the leading edge of the item under inspection.

12. An optical inspection apparatus as recited in claim 1, further including means for selectively ignoring information contained in a certain number of vertical sweeps made proximate to the trailing edge of the item under inspection.

* * * * *